(12) United States Patent
Adams

(10) Patent No.: US 7,571,953 B2
(45) Date of Patent: Aug. 11, 2009

(54) TRAILER

(75) Inventor: James H. Adams, Tallmadge, OH (US)

(73) Assignee: Fontaine Trailer Company, Haleyville, AL (US)

( * ) Notice: Subject to any disclaimer, the term of this patent is extended or adjusted under 35 U.S.C. 154(b) by 0 days.

(21) Appl. No.: 11/235,757

(22) Filed: Sep. 27, 2005

(65) Prior Publication Data

US 2006/0071506 A1    Apr. 6, 2006

Related U.S. Application Data

(60) Provisional application No. 60/616,029, filed on Oct. 5, 2004.

(51) Int. Cl.
*B62D 25/20* (2006.01)
*B62D 21/09* (2006.01)
*B62D 33/02* (2006.01)

(52) U.S. Cl. .............. 296/184.1; 296/193.07; 296/204; 410/104

(58) Field of Classification Search ............. 296/184.1, 296/183.1, 204, 193.07, 43; 280/789; 410/101, 410/104, 105

See application file for complete search history.

(56) References Cited

U.S. PATENT DOCUMENTS

| | | | | |
|---|---|---|---|---|
| 3,422,508 | A * | 1/1969 | Higuchi | 410/105 |
| 3,705,732 | A * | 12/1972 | Marinelli | 280/789 |
| 3,909,059 | A * | 9/1975 | Benninger et al. | 296/184.1 |
| 4,020,769 | A * | 5/1977 | Keir | 410/96 |
| 4,049,285 | A * | 9/1977 | Chieger | 280/789 |
| 4,226,465 | A * | 10/1980 | McCullough | 296/184.1 |
| 4,358,134 | A * | 11/1982 | Scully | 280/676 |
| 4,626,022 | A * | 12/1986 | Booher | 296/184.1 |
| 4,787,669 | A * | 11/1988 | Wante | 296/184.1 |
| 4,838,605 | A * | 6/1989 | Abromavage | 296/184.1 |
| 5,417,453 | A | 5/1995 | VanDenberg | |
| 5,474,331 | A * | 12/1995 | Booher | 280/789 |
| 6,174,023 | B1 * | 1/2001 | Booher | 296/184.1 |
| 6,182,411 | B1 * | 2/2001 | Ganser et al. | 52/480 |
| 6,283,538 | B1 * | 9/2001 | Reitnouer | 296/184.1 |
| 6,439,814 | B1 * | 8/2002 | Floe | 410/7 |
| 6,527,487 | B2 * | 3/2003 | Adams | 410/104 |
| 6,669,271 | B2 | 12/2003 | Booher | |
| 6,712,568 | B2 * | 3/2004 | Snyder et al. | 410/104 |
| 6,846,140 | B2 * | 1/2005 | Anderson et al. | 410/104 |
| 6,871,904 | B2 * | 3/2005 | Bhat et al. | 296/183.1 |
| 6,948,895 | B2 * | 9/2005 | Buff | 410/104 |
| 6,960,055 | B2 * | 11/2005 | Musso et al. | 414/528 |
| 6,984,095 | B2 * | 1/2006 | Johnson | 410/101 |
| 7,070,374 | B2 * | 7/2006 | Womack et al. | 410/104 |
| 7,175,377 | B2 * | 2/2007 | Womack et al. | 410/104 |

(Continued)

*Primary Examiner*—Glenn Dayoan
*Assistant Examiner*—Gregory Blankenship
(74) *Attorney, Agent, or Firm*—Angela Holt; Lanier Ford Shaver & Payne P.C.

(57) ABSTRACT

A trailer includes a floor engageable with a load and a longitudinally extending support member. The support member has an upper portion connected to the floor, a lower portion connectable to a suspension system, and a web extending between the upper and lower portions and transverse to the floor. The lower portion has a lower flange extending transverse to the web and connectable to the suspension system. The lower flange has a first portion extending from a first side of the web a first distance and a second portion extending from a second opposite side of the web a second distance larger than the first distance.

16 Claims, 3 Drawing Sheets

U.S. PATENT DOCUMENTS

2004/0007864 A1 1/2004 Adams
2004/0009049 A1 1/2004 Booher
2004/0135398 A1 7/2004 Booher

* cited by examiner

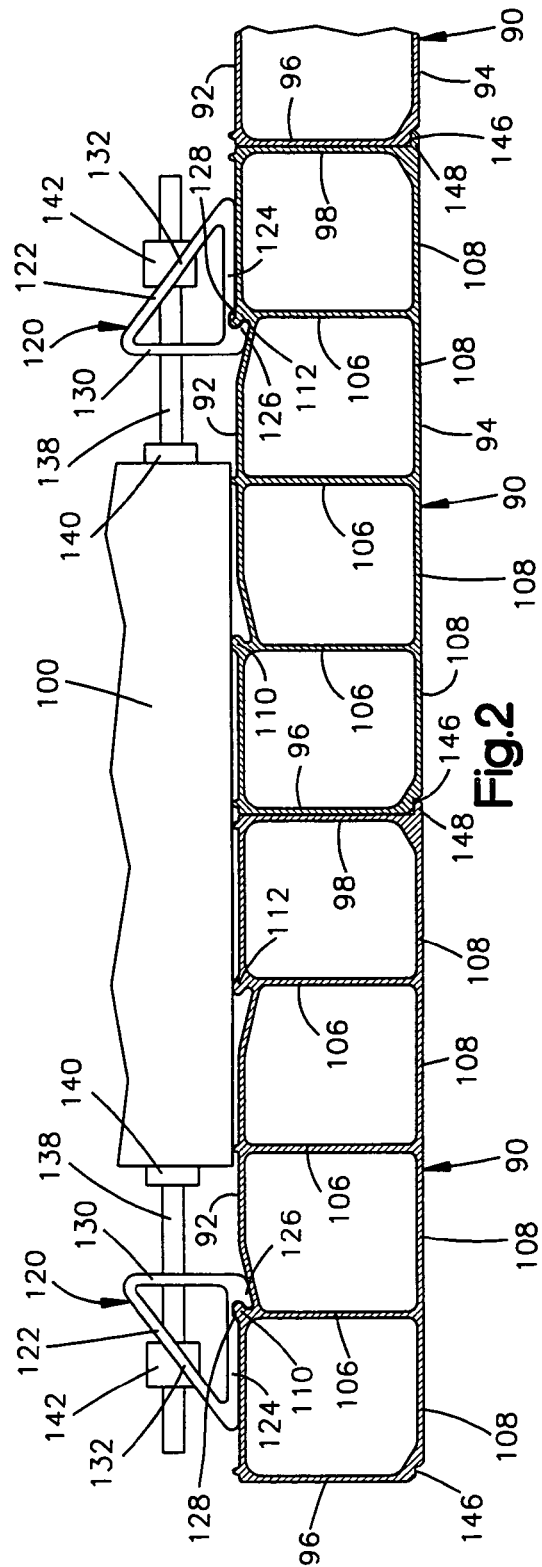
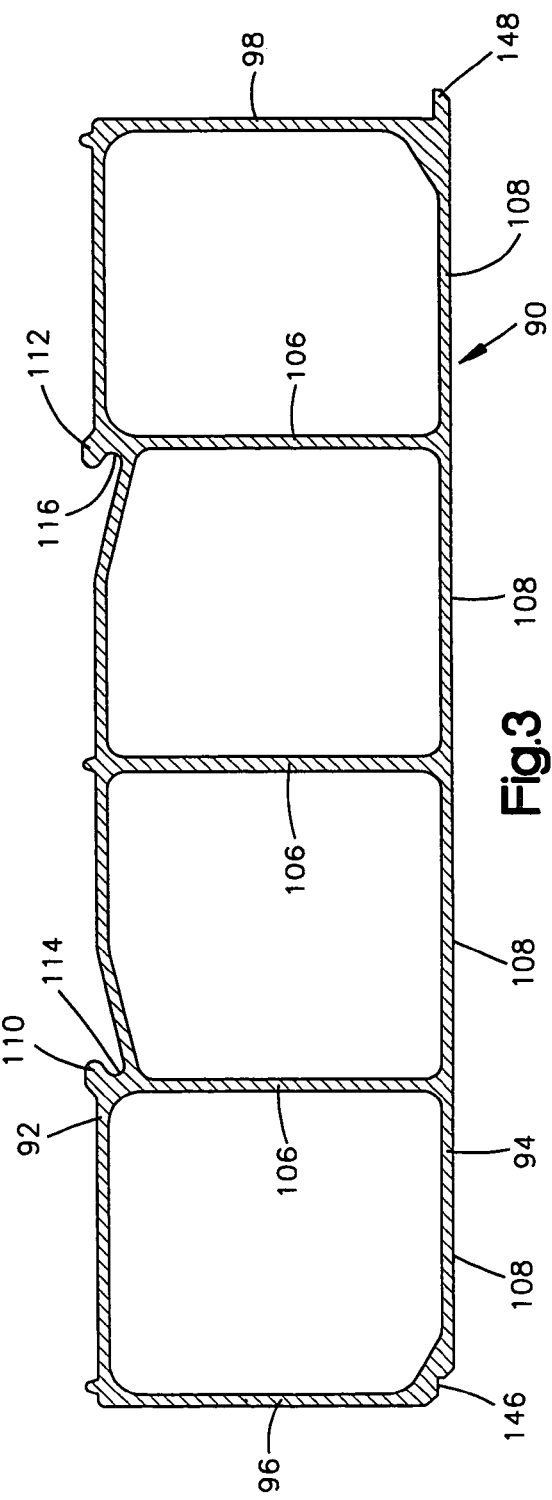

TRAILER

RELATED APPLICATION

This application is related to U.S. Provisional Patent Application Ser. No. 60/616,029, filed Oct. 5, 2004, the subject matter of which is incorporated herein by reference.

TECHNICAL FIELD

The present invention relates to a trailer, and more specifically, to a flatbed trailer.

BACKGROUND OF THE INVENTION

A trailer, such as a flatbed trailer, includes a pair of longitudinally extending I-beams that extend the length of the bed. Each I-beam includes an upper flange, a lower flange extending parallel to the upper flange, and a web interconnecting the upper and lower flanges. A suspension system is connected to the lower flange. Cross members extend through the webs and are connected to the webs. Longitudinally extending floor members are connected to upper surfaces of the cross members. The floor members extend between the I-beams so that a load may engage upper surfaces of the I-beams and the floor members. Typically at least one of the floor members is made of wood for securing a payload to the trailer.

SUMMARY OF THE INVENTION

A trailer includes a floor engageable with a load and a first longitudinally extending support member. The first support member has an upper portion connected to the floor, a lower portion connectable to a suspension system, and a web extending between the upper and lower portions and transverse to the floor. The lower portion has a lower flange extending transverse to the web and connectable to the suspension system. The lower flange has a first portion extending from a first side of the web a first distance and a second portion extending from a second opposite side of the web a second distance larger than the first distance.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 2 is a schematic sectional view of a floor of the trailer of FIG. 1 showing a load secured on the floor;

FIG. 3 is an enlarged sectional view of a portion of the floor of FIG. 2; and

DESCRIPTION OF EMBODIMENTS

Figure 1:
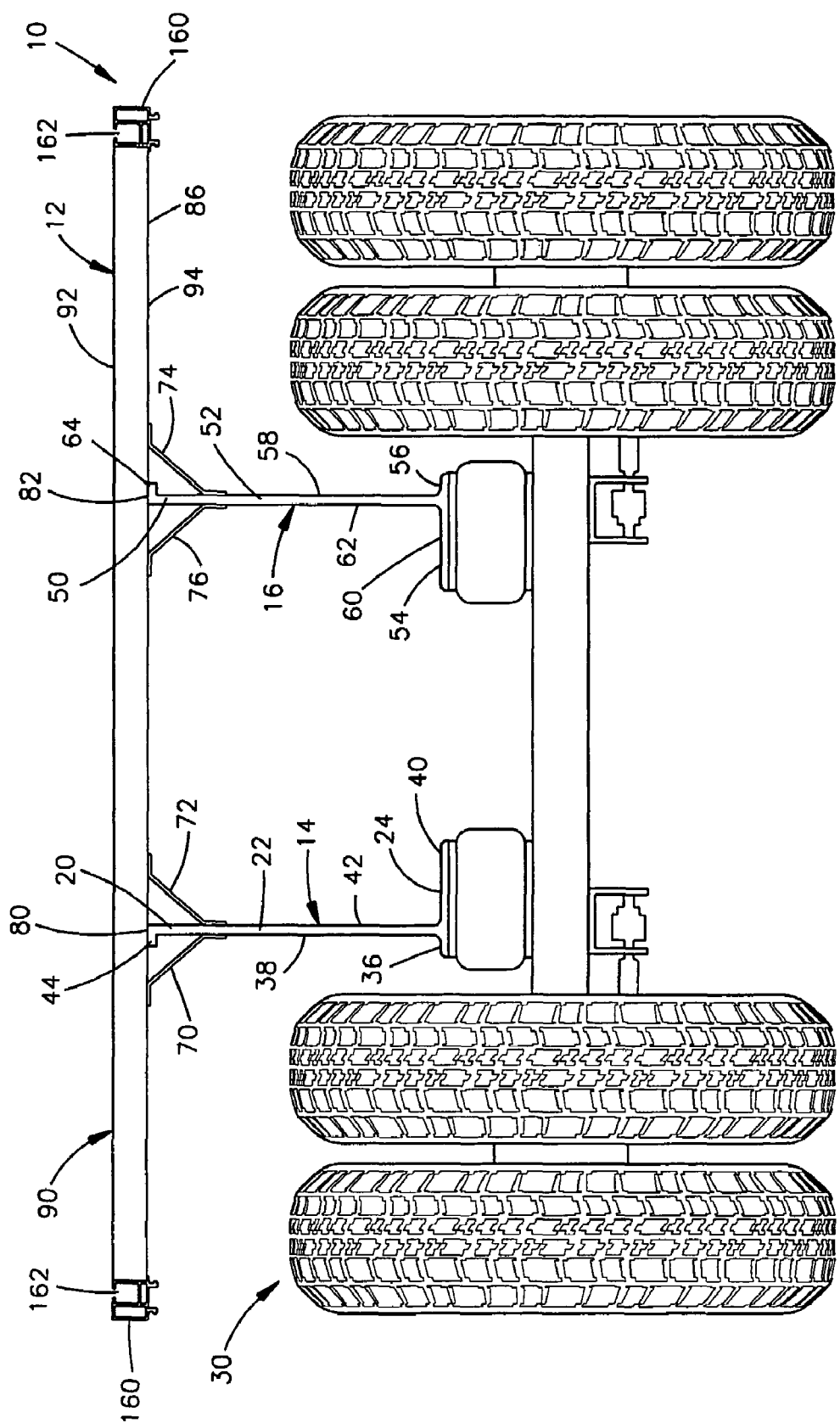
FIG. 1 is a schematic rear view of a first embodiment of a trailer.

The present invention is directed to a trailer, and more specifically, to a flatbed trailer. As representative of a first embodiment of the present invention, FIG. 1 schematically illustrates a flatbed trailer 10. The trailer 10 includes a floor 12 and first and second longitudinally extending support members 14 and 16 for the floor. The support members 14 and 16 may be manufactured by extrusion. The support members 14 and 16 extend generally parallel to each other along the length of the trailer 10.

The support member 14 includes an upper portion 20 connected to the floor 12. A web 22 extends downwardly, as viewed in FIG. 1, and transverse to the floor 12. The web 22 may extend generally perpendicular to the floor 12. The web 22 extends between the upper portion 20 and a lower flange or lower portion 24. The web 22 may include a tapered lower portion connected to the lower flange 24 for added reinforcement.

The lower flange or lower portion 24 extends transverse to the web 22. The lower flange 24 may extend generally perpendicular to the web 22 and generally parallel to the floor 12. The web 22 interconnects the upper portion 20 and the lower flange 24. A suspension system 30, which is schematically shown in FIG. 1, is connected with the lower flange 24.

The lower flange 24 includes a first portion 36 extending from a first side 38 of the web 22 in a direction away from the support member 16. The first portion 36 extends from the web 22 a first distance. The first portion 36 may extend any desired distance from the web 22. It is contemplated that the first portion 36 may extend approximately two to three inches from the web 52.

The lower flange 24 includes a second portion 40 extending from a second opposite side 42 of the web 22 in a direction toward the support member 16. The second portion 40 of the lower flange 24 extends from the web 22 a second distance larger than the first distance. The second portion 40 may extend any desired distance from the web 52. It is contemplated that the second portion 40 may extend approximately six to ten inches from the web 52.

The upper portion 20 of the support member 14 may include a small upper flange 44 extending from the first side 38 of the web 22 in a direction away from the support member 16. The flange 44 extends transverse to the web 22. The flange 44 may extend generally parallel to the lower flange 24 and generally perpendicular to the web 22. It is contemplated that the upper flange 44 may include a second portion extending from the second side 42 of the web 22.

The support member 16 includes an upper portion 50 connected to the floor 12. A web 52 extends downwardly, as viewed in FIG. 1, and transverse to the floor 12. The web 52 may extend generally perpendicular to the floor 12 and generally parallel to the web 22 of the support member 14. The web 52 extends between the upper portion 50 and a lower flange or lower portion 54. The web 52 may include a tapered lower portion connected to the lower flange 54 for added reinforcement.

The lower flange or lower portion 54 extends transverse to the web 52. The lower flange 54 may extend generally perpendicular to the web 52 and generally parallel to the floor 12. The web 52 interconnects the upper portion 50 and the lower flange 54. The suspension system 30, which is schematically shown in FIG. 1, is connected with the lower flange 54.

The lower flange 54 includes a first portion 56 extending from a first side 58 of the web 52 in a direction away from the support member 14. The first portion 56 extends from the web 52 a first distance. The first portion 56 may extend any desired distance from the web 52. It is contemplated that the first portion 56 may extend approximately two to three inches from the web 52.

The lower flange 54 includes a second portion 60 extending from a second opposite side 62 of the web 52 in a direction toward the support member 14. The second portion 60 of the lower flange 54 extends from the web 52 a second distance larger than the first distance. The second portion 60 may extend any desired distance from the web 52. It is contemplated that the second portion 60 may extend approximately six to ten inches from the web 52.

The upper portion 50 of the support member 16 may include a small upper flange 64 extending from the first side 58 of the web 52 in a direction away from the support member 14. The flange 64 extends transverse to the web 52. The flange 64 may extend generally parallel to the lower flange 54 and generally perpendicular to the web 52. It is contemplated that the upper flange 64 may include a second portion extending from the second side 62 of the web 52.

A first bracket 70 is connected to the floor 12 and the first side 38 of the web 22 of the support member 14. A second bracket 72 is connected to the floor 12 and the second side 42 of the web 22 of the support member 14. A third bracket 74 is connected to the floor 12 and the first side 58 of the web 52 of the support member 16. A fourth bracket 76 is connected to the floor 12 and the second side 62 of the web 52 of the support member 16. The brackets 70, 72, 74 and 76 may be connected to the floor 12 and the support members 14, 16 in any desired manner, such as welding. It is contemplated that any number of brackets may be connected to the floor and the support members 14 and 16 along the longitudinal length of the support members. It is also contemplated that brackets may be connected to only one side of each of the support members 14 and 16.

The floor 12 is connected to an upper surface 80 of the upper portion 20 of the first support member 14 and an upper surface 82 of the upper portion 50 of the second support member 16. A lower surface 86 of the floor 12 engages the upper surfaces 80 and 82 of the support members 14 and 16. The lower surface 86 of the floor 12 also engages the brackets 70, 72, 74 and 76. The floor 12 may be connected to the upper surfaces 80 and 82 of support members 14 and 16 and the brackets 70, 72, 74, and 76 in any desired manner, such as welding.

The floor 12 (FIGS. 2 and 3) may include a plurality of floor sections 90 connected to each other. The floor 12 may include any desired number of floor sections 90. The floor sections 90 may be connected to each other in any desired manner, such as welding. The floor sections 90 may be made in any desired manner, such as extrusion.

Each floor section 90 is identical, accordingly, only one floor section 90 will be described in detail. The floor section 90 (FIGS. 2 and 3) includes an upper wall or portion 92 and a lower wall or portion 94. Side walls portions 96 and 98 extend generally perpendicular to the upper and lower walls 92 and 94. A load 100, schematically shown in FIG. 2, may engage the upper wall 92. The lower wall 94 (FIG. 1) engages the support members 14 and 16. The side walls 96 and 98 (FIG. 2) engage side walls of adjacent floor sections 90.

A plurality of partitioning walls 106 (FIGS. 2 and 3) extend generally perpendicular to the upper and lower walls 92 and 94 and generally parallel to the side walls 96 and 98. The partitioning walls 106 define a plurality of tubular portions 108 extending transverse to longitudinal axes of the support members 14 and 16. Although three partitioning walls 106 defining four tubular portions 108 are shown in FIGS. 2 and 3, it is contemplated that the floor section 90 may have any desired number of partitioning walls 106 defining any desired number of tubular portions 108.

The upper wall 92 (FIGS. 2 and 3) includes a pair of hook portions 110 and 112 extending upward, as viewed in FIGS. 2 and 3, away from the bottom wall 94 and the support members 14 and 16. The hook portion 110 (FIG. 3) defines a recess 114 facing toward the hook portion 112 and a front of the trailer. The hook portion 112 defines a recess 116 facing toward the hook portion 114 and a rear of the trailer.

The hook portions 110 and 112 engage supports 120 (FIG. 2) for helping to secure the load 100 to the floor 12. The supports 120 are identical, accordingly only one support 120 will be described in detail. The support 120 includes a base or bracket 122. The bracket 122 has a lower wall 124 with a hook portion 126 defining a recess 128. The hook portion 126 of the bracket 122 extends into one of the recesses 114 or 116 in the floor 12 and one of the hook portions 110 or 112 extends into the recess 128 in the bracket 122 to hold the support 120 in position on the floor 12.

The bracket 122 includes a second wall 130 extending generally perpendicular to the lower wall 124. A third wall 132 extends between the lower wall 124 and the second wall 130 so that the bracket 122 has a triangular cross-section. The second and third walls 130 and 132 have openings (not shown) through which a lock bar 138 extends. A block 140 for engaging the load 100 is connected to an end of the lock bar 138.

The lock bar 138 also extends through a locking mechanism 142 connected to the third wall 132. The lock bar 138 is movable relative to the locking mechanism 142 and the bracket 122 to position the block 140 in engagement with the load 100. The locking mechanism 142 locks the lock bar 138 and the block 140 in position relative to the load 100 and the bracket 122. The locking mechanism 142 may have any desired construction that permits the lock bar 138 to be positioned relative to the bracket 122 and the load 100 and can lock the lock bar in a desired position. Accordingly, supports 120 may be easily placed on opposite sides of the load 100 to help secure the load to the floor 12. Although two supports 120 are shown in FIG. 2, it is contemplated that any number of supports 120 could be used to help secure the load.

The lower wall 94 (FIGS. 2 and 3) of the floor section 90 includes a notch or recess 146 where the lower wall intersects the side wall 96 in a lower left corner of the floor section, as viewed in FIGS. 2 and 3. A tab or flange 148 extends from the lower wall 94 where the lower wall intersects the side wall 98 at a lower right corner of the floor section 90, as viewed in FIGS. 2 and 3. The tab or flange 148 (FIG. 2) extends into the recess 146 of an adjacent floor section 90 of the floor 12. The tab or flange 148 may be connected to the adjacent floor section 90 in any desired manner, such as welding.

The floor 12 (FIG. 1) may include a pair of longitudinally extending side rails 160. Each of the rails 160 may include a slot 162 for helping secure the load 100 to the floor 12. The side rails 160 may have any desired shape.

Figure 4:
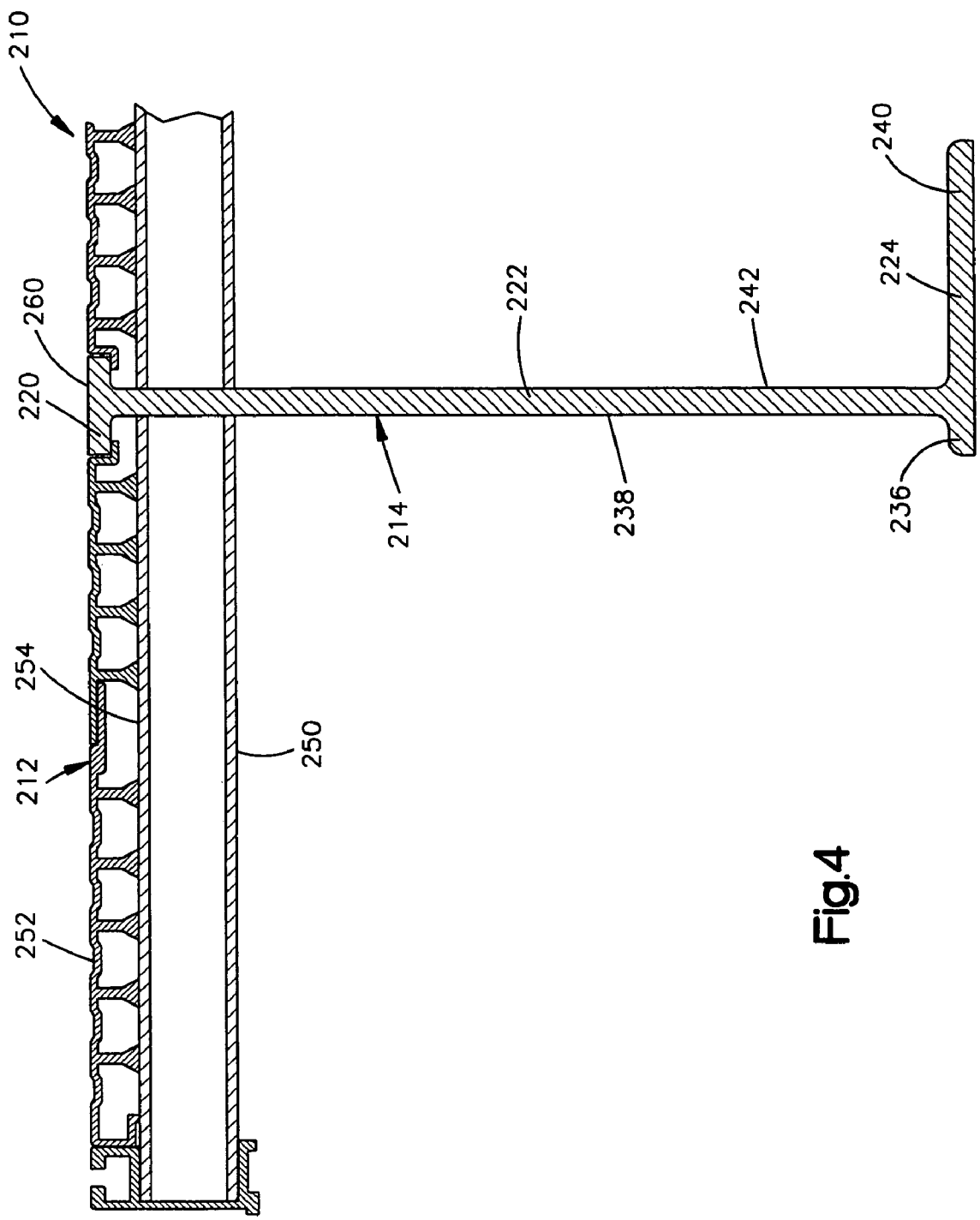
FIG. 4 is a schematic sectional view of a portion of a second embodiment of a trailer.

As representative of a second embodiment of the present invention, FIG. 4 schematically illustrates a portion of a flatbed trailer 210. The trailer 210 includes a floor 212 and a first longitudinally extending support member 214 and a second longitudinally extending support member (not shown) for the floor. The first support member 214 extends generally parallel to the second support member along the length of the trailer 210. The first support member 214 and the second support member may be manufactured by extrusion.

The first support member 214 is generally similar to the second support member, accordingly, only the first support member 214 will be described in detail. The support member 214 includes an upper portion or upper flange 220. A web 222 extends downwardly, as viewed in FIG. 4, and transverse to the upper flange 220 and the floor 212. The web 222 may extend generally perpendicular to the floor 212 and the upper flange 220. The web 222 extends between the upper flange 220 and a lower flange or lower portion 224. The web 222 may include a tapered lower portion connected to the lower flange 224 for added reinforcement.

The lower flange or lower portion 224 extends transverse to the web 222. The lower flange 224 may extend generally perpendicular to the web 222 and generally parallel to the upper flange 220. A suspension system (not shown) is connected with the lower flange 224.

The lower flange 224 includes a first portion 236 extending from a first side 238 of the web 222 in a direction away from the second support member. The first portion 236 extends from the web 222 a first distance. The first portion 236 may extend any desired distance from the web 222. It is contemplated that the first portion 236 may extend approximately two to three inches from the web 222.

The lower flange 224 includes a second portion 240 extending from a second opposite side 242 of the web 222 in a direction toward the second support member. The second portion 240 of the lower flange 224 extends from the web 222 a second distance larger than the first distance. The second portion 240 may extend any desired distance from the web 222. It is contemplated that the second portion 240 may extend approximately six to ten inches from the web 222.

A plurality of cross members 250, one of which is shown in FIG. 4, extends through the web 222 of the first support member 214 and a web of the second support member and are connected to the webs. The cross members 250 may be connected to the web 222 and the web of the second support member in any desired manner, such as welding. Longitudinally extending floor members 252 are connected to upper surfaces 254 of the cross members 250. The floor members 252 extend between the first support member 214 and the second support member so that an upper surface 260 of the upper flange 220 of the support member 214 and an upper surface of the second support member may engage a load.

Although the floor 12 is shown with the support members 14 and 16, it is contemplated that the floor 12 could be used with the support member 214 or any desired support member. Furthermore, it is contemplated that the floor 12 may not include the hook portions 110 and 112. It is also contemplated that the hook portions 110 and 112 may be used on any desired floor for helping secure a load to a trailer.

From the above description of the invention, those skilled in the art will perceive improvements, changes and modifications. Such improvements, changes and modifications within the skill of the art are intended to be covered by the appended claims.

Having described the invention, I claim:

1. A trailer comprising:
a floor engageable with a load, the floor comprising a plurality of tubular portions;
a first longitudinally extending support member, the first support member having an upper portion connected to the floor, a lower portion connectable to a suspension system, and a web extending between the upper and lower portions and transverse to the floor, the lower portion having a lower flange extending transverse to the web and connectable to the suspension system, the lower flange having a first portion extending from a first side of the web a first distance and a second portion extending from a second opposite side of the web a second distance greater than the first distance, the first and second distances being greater than approximately five inches combined; and
at least a pair of support brackets for securing the load;
wherein the tubular portions extend transverse to a longitudinal axis of the first support member; and
wherein said tubular portions comprise four tubular portions defined by an upper wall, a lower wall, two side walls, and three partitioning walls, and wherein the outermost two of the three partitioning walls extend above the upper wall and form inward-facing hooks for receiving the at least one pair of support brackets.

2. A trailer as set forth in claim 1 wherein the second distance is three times greater than the first distance.

3. A trailer as set forth in claim 1 further including a second longitudinally extending support member for the floor, the second support member extending generally parallel to the first support member, the second support member having an upper portion connected to the floor, a lower portion connectable to a suspension system, and a web extending between the upper and lower portions and transverse to the floor, and the lower portion of the second support member having a lower flange extending transverse to the web and connectable to the suspension system, the lower flange of the second support member having a first portion extending from a first side of the web of the second support member a first distance and a second portion extending from a second opposite side of the web of the second support member a second distance greater than the first distance, the first and second distances of the lower flange of the second support member being greater than approximately five inches combined.

4. A trailer as set forth in claim 3 wherein the second portion of the lower flange of the first support member extends toward the second support member and the second portion of the lower flange of the second support member extends toward the first support member.

5. A trailer as set forth in claim 1 wherein the upper portion of the first support member includes an upper flange connected to the floor, the upper flange extending transverse to the web.

6. A trailer as set forth in claim 1 wherein the upper portion of the first support member has an upper surface, the floor engaging the upper surface.

7. A trailer as set forth in claim 1 wherein the floor has a lower surface engaging the upper surface of the support member, the floor having a plurality of tubular portions extending transverse to a longitudinal axis of the first support member.

8. A trailer as set forth in claim 1 wherein the first distance is approximately two to three inches and the second distance is approximately six to ten inches.

9. A trailer as set forth in claim 1 wherein the upper portion of the first support member has an upper surface, the load being engageable with the upper surface.

10. A trailer as set forth in claim 1 wherein the second distance is approximately three to five times greater than the first distance.

11. A trailer as set forth in claim 1 wherein the first support member is an extruded member.

12. A trailer comprising:
a floor engageable with a load, the floor comprising
a plurality of substantially rectangular floor sections, each floor section comprising
an upper wall with two side edges, a front edge, and a rear edge;
a substantially rectangular lower wall substantially parallel to the upper wall and extending to the side edges, front edge, and rear edge of the upper wall;
two side walls coextensive with the side edges and lower wall and extending substantially perpendicular to the upper and lower walls;
a plurality of partitioning walls extending substantially perpendicular to the upper and lower walls and substantially parallel to the side walls, wherein the partitioning walls, the upper wall, the lower wall, and the side walls define a plurality of tubular portions;

a first longitudinally extending support member, said first support member having an upper portion connected to a bottom of the lower wall, a lower portion connectable to a suspension system, and a web extending between said upper and lower portions and transverse to said floor, said lower portion having a lower flange extending transverse to said web and connectable to the suspension system; and at least one pair of support brackets for securing said load; wherein said upper wall further comprises at least one pair of recesses for receiving said at least one pair of support brackets; and wherein the plurality of partitioning walls consists of three partitioning walls forming four tubular portions and wherein the outermost two of the three partitioning walls extend above the upper wall and form inward-facing hooks for receiving the at least one pair of support brackets.

13. A trailer, comprising:

a plurality of floor sections having an upper wall, a lower wall, and one or more partitioning walls connecting the upper wall to the lower wall, at least one of said first partitioning walls extending angularly from and extending integral with the upper wall for receiving and holding in position one or more support brackets, a longitudinally extending support member, said support member having an upper portion connected directly to said lower wall of said plurality of floor sections, a lower portion connectable to a suspension system, and a web extending between said upper and lower portions, said lower portion having a lower flange extending transverse to said web and connectable to the suspension system.

14. The trailer of claim 13, wherein at least one other second partitioning wall extends angularly from and extends integral with the upper wall for receiving and holding in position one or more support brackets, said second partitioning wall extending angularly in an opposite direction from the first partitioning wall.

15. The trailer of claim 14, wherein each floor section has on a first outer side wall a tab and on an opposing second outer side wall a first recess, wherein when said floor is assembled, at least one tab on one of the floor sections is coupled to said at least one first recess on another floor section.

16. The trailer of claim 15, wherein said at least one tab is welded to said at least one first recess.

* * * * *